US009855817B2

(12) United States Patent
Hsiao et al.

(10) Patent No.: US 9,855,817 B2
(45) Date of Patent: Jan. 2, 2018

(54) VEHICLE OPERATING SYSTEM USING MOTION CAPTURE (71) Applicant: THUNDER POWER NEW ENERGY VEHICLE DEVELOPMENT COMPANY LIMITED, Central (HK)

(72) Inventors: Jen-Chieh Hsiao, Taipei (TW); Yong-Syuan Chen, New Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 14/967,368

(22) Filed: Dec. 14, 2015

(65) Prior Publication Data
US 2016/0274669 A1 Sep. 22, 2016

Related U.S. Application Data (63) Continuation of application No. 14/883,621, filed on Oct. 15, 2015, now Pat. No. 9,547,373.
(Continued)

(51) Int. Cl.
G06F 3/01 (2006.01)
G06F 3/041 (2006.01)
(Continued)

(52) U.S. Cl.
CPC ....... B60H 1/00392 (2013.01); B29C 65/002 (2013.01); B32B 3/266 (2013.01);
(Continued)

(58) Field of Classification Search
None
See application file for complete search history.

(56) References Cited

U.S. PATENT DOCUMENTS 4,026,468 A 5/1977 Tinder et al.
4,248,383 A 2/1981 Savage et al.
(Continued)

FOREIGN PATENT DOCUMENTS

CN 101291834 A 10/2008
CN 103448685 A 12/2013
(Continued)

OTHER PUBLICATIONS

Specification U.S. Appl. No. 62/133,991.*
(Continued)

Primary Examiner — Mohammad J Rahman
(74) Attorney, Agent, or Firm — Kilpatrick Townsend & Stockton LLP (57) ABSTRACT Vehicle operating systems for operating a vehicle having a driving seat for a vehicle driver and at least one passenger seat for passengers are described. The vehicle operating system may include one or more camera devices for shooting images of hand actions of the driver or images of hand actions of a passenger, and a storage device for storing operating signals corresponding to hand actions. A processing device may be configured to select the driver or the passengers as a gesture command operator, and to control the camera device to shoot hand action images of the selected gesture command operator. The command system may also be configured to convert the shot hand action images into corresponding operating signals according to hand action indicia stored in the storage device. The operating signals may be sent to execution devices, that execute the corresponding operations.

20 Claims, 6 Drawing Sheets

Related U.S. Application Data (60) Provisional application No. 62/150,848, filed on Apr. 22, 2015, provisional application No. 62/133,991, filed on Mar. 16, 2015.

(51) Int. Cl.

| | | |
|---|---|---|
| *B60H 1/00* | (2006.01) | |
| *B60L 11/18* | (2006.01) | |
| *H02J 7/00* | (2006.01) | |
| *B29C 65/00* | (2006.01) | |
| *B32B 3/26* | (2006.01) | |
| *B32B 7/04* | (2006.01) | |
| *B60L 1/02* | (2006.01) | |
| *B60H 1/14* | (2006.01) | |
| *B60R 1/00* | (2006.01) | |
| *G06F 3/00* | (2006.01) | |
| *G06K 9/00* | (2006.01) | |
| *H01M 10/613* | (2014.01) | |
| *H01M 10/625* | (2014.01) | |
| *H01M 10/6557* | (2014.01) | |
| *H01M 10/48* | (2006.01) | |
| *B60K 11/04* | (2006.01) | |
| *B60K 11/08* | (2006.01) | |
| *F25B 29/00* | (2006.01) | |
| *H01M 10/663* | (2014.01) | |
| *H01M 10/6563* | (2014.01) | |
| *C09J 5/00* | (2006.01) | |
| *F16B 11/00* | (2006.01) | |
| *H01M 10/658* | (2014.01) | |
| *H01M 10/63* | (2014.01) | |
| *H01M 10/6568* | (2014.01) | |
| *B60H 1/22* | (2006.01) | |
| *B60K 1/04* | (2006.01) | |
| *B32B 15/00* | (2006.01) | |
| *B32B 15/01* | (2006.01) | |
| *F16B 3/00* | (2006.01) | |
| *F16B 5/04* | (2006.01) | |
| *H01M 10/6566* | (2014.01) | |
| *G06F 3/0482* | (2013.01) | |
| *G06F 3/0484* | (2013.01) | |
| *G06F 3/0486* | (2013.01) | |
| *G06F 3/0488* | (2013.01) | |
| *B60K 1/00* | (2006.01) | |

(52) U.S. Cl.
CPC ............... *B32B 7/04* (2013.01); *B32B 7/045* (2013.01); *B32B 15/00* (2013.01); *B32B 15/01* (2013.01); *B60H 1/00021* (2013.01); *B60H 1/00278* (2013.01); *B60H 1/00321* (2013.01); *B60H 1/00328* (2013.01); *B60H 1/00428* (2013.01); *B60H 1/00564* (2013.01); *B60H 1/00571* (2013.01); *B60H 1/00885* (2013.01); *B60H 1/143* (2013.01); *B60H 1/2215* (2013.01); *B60K 1/04* (2013.01); *B60K 11/04* (2013.01); *B60K 11/085* (2013.01); *B60L 1/02* (2013.01); *B60L 11/1809* (2013.01); *B60L 11/1848* (2013.01); *B60L 11/1861* (2013.01); *B60L 11/1862* (2013.01); *B60L 11/1864* (2013.01); *B60L 11/1874* (2013.01); *B60L 11/1875* (2013.01); *B60L 11/1879* (2013.01); *B60R 1/00* (2013.01); *C09J 5/00* (2013.01); *F16B 3/005* (2013.01); *F16B 5/04* (2013.01); *F16B 11/00* (2013.01); *F25B 29/00* (2013.01); *G06F 3/005* (2013.01); *G06F 3/017* (2013.01); *G06F 3/0416* (2013.01); *G06F 3/0482* (2013.01); *G06F 3/0486* (2013.01); *G06F 3/0488* (2013.01); *G06F 3/04842* (2013.01); *G06F 3/04847* (2013.01); *G06K 9/00013* (2013.01); *G06K 9/00342* (2013.01); *G06K 9/00832* (2013.01); *H01M 10/482* (2013.01); *H01M 10/486* (2013.01); *H01M 10/613* (2015.04); *H01M 10/625* (2015.04); *H01M 10/63* (2015.04); *H01M 10/658* (2015.04); *H01M 10/6557* (2015.04); *H01M 10/6563* (2015.04); *H01M 10/6566* (2015.04); *H01M 10/6568* (2015.04); *H01M 10/663* (2015.04); *H02J 7/0019* (2013.01); *H02J 7/0021* (2013.01); *B32B 2605/00* (2013.01); *B32B 2605/08* (2013.01); *B32B 2605/18* (2013.01); *B60H 2001/003* (2013.01); *B60H 2001/00092* (2013.01); *B60H 2001/00949* (2013.01); *B60K 2001/005* (2013.01); *B60K 2001/006* (2013.01); *B60R 2300/8006* (2013.01); *B60Y 2200/91* (2013.01); *B60Y 2306/07* (2013.01); *B60Y 2400/112* (2013.01); *F16B 11/006* (2013.01); *H01M 2220/20* (2013.01); *Y10T 428/24347* (2015.01)

(56) References Cited

U.S. PATENT DOCUMENTS

| | | | |
|---|---|---|---|
| 4,324,363 | A | 4/1982 | Rauen, Jr. |
| 5,115,342 | A | 5/1992 | Rowe et al. |
| 6,766,036 | B1 | 7/2004 | Pryor |
| 7,289,645 | B2 | 10/2007 | Yamamoto et al. |
| 8,625,855 | B2 | 1/2014 | El Dokor |
| 8,818,716 | B1 * | 8/2014 | El Dokor ............... G01C 21/00 701/426 |
| 8,983,718 | B2 | 3/2015 | Ricci |
| 9,539,988 | B2 | 1/2017 | Hsiao et al. |
| 9,547,373 | B2 | 1/2017 | Hsiao et al. |
| 9,586,618 | B2 | 3/2017 | Sham |
| 9,604,601 | B2 | 3/2017 | Hsiao et al. |
| 2002/0005440 | A1 | 1/2002 | Holt et al. |
| 2002/0134857 | A1 | 9/2002 | Zimmer |
| 2003/0155001 | A1 | 8/2003 | Hoetzer et al. |
| 2005/0206511 | A1 | 9/2005 | Heenan et al. |
| 2007/0077541 | A1 | 4/2007 | Champagne et al. |
| 2007/0084484 | A1 | 4/2007 | Porter et al. |
| 2007/0278325 | A1 | 12/2007 | Sato et al. |
| 2008/0116379 | A1 | 5/2008 | Teder |
| 2008/0210780 | A1 | 9/2008 | Discher et al. |
| 2009/0098815 | A1 * | 4/2009 | Hotary ............... B60H 1/00742 454/75 |
| 2009/0250533 | A1 | 10/2009 | Akiyama et al. |
| 2009/0278915 | A1 | 11/2009 | Kramer et al. |
| 2010/0230991 | A1 | 9/2010 | Fioravanti |
| 2010/0274480 | A1 | 10/2010 | McCall et al. |
| 2011/0031921 | A1 | 2/2011 | Han |
| 2011/0073142 | A1 | 3/2011 | Hattori et al. |
| 2011/0107272 | A1 * | 5/2011 | Aguilar ............... G06F 3/04815 715/853 |
| 2011/0128543 | A1 | 6/2011 | Choi |
| 2011/0128555 | A1 | 6/2011 | Rotschild et al. |
| 2011/0266375 | A1 | 11/2011 | Ono et al. |
| 2011/0292212 | A1 | 12/2011 | Tanabe et al. |
| 2012/0032899 | A1 * | 2/2012 | Waeller ............... G01C 21/3664 345/173 |
| 2012/0163657 | A1 * | 6/2012 | Shellshear ......... G06K 9/00751 382/103 |
| 2012/0266922 | A1 | 10/2012 | Krahn et al. |
| 2012/0274549 | A1 * | 11/2012 | Wehling ............... B60K 35/00 345/156 |
| 2013/0092758 | A1 | 4/2013 | Tanaka et al. |
| 2013/0094086 | A1 | 4/2013 | Bochenek |
| 2013/0117963 | A1 | 5/2013 | Liu |
| 2013/0235381 | A1 | 9/2013 | Kroekel et al. |
| 2014/0009615 | A1 | 1/2014 | Kiyohara et al. |
| 2014/0081521 | A1 | 3/2014 | Frojdh et al. |

(56) References Cited

U.S. PATENT DOCUMENTS

| | | | |
|---|---|---|---|
| 2014/0089864 A1 | 3/2014 | Cheng et al. | |
| 2014/0090673 A1 | 4/2014 | Atsumi et al. | |
| 2014/0121927 A1 | 5/2014 | Hanita | |
| 2014/0145933 A1* | 5/2014 | Chae | B60K 37/06 345/156 |
| 2014/0222253 A1* | 8/2014 | Siegel | B60R 16/037 701/2 |
| 2014/0223384 A1 | 8/2014 | Graumann | |
| 2014/0277936 A1* | 9/2014 | El Dokor | G06F 3/017 701/36 |
| 2014/0282271 A1 | 9/2014 | Lu et al. | |
| 2014/0306826 A1* | 10/2014 | Ricci | H04W 48/04 340/573.1 |
| 2014/0309849 A1* | 10/2014 | Ricci | B60Q 1/00 701/33.4 |
| 2015/0022664 A1* | 1/2015 | Pflug | H04N 7/181 348/148 |
| 2015/0054933 A1* | 2/2015 | Wasiek | B60R 1/12 348/77 |
| 2015/0138357 A1 | 5/2015 | Romack et al. | |
| 2015/0141043 A1* | 5/2015 | Abramson | G01C 21/34 455/456.1 |
| 2015/0151722 A1 | 6/2015 | Gokan et al. | |
| 2015/0168174 A1* | 6/2015 | Abramson | G01C 21/3697 701/408 |
| 2015/0203077 A1 | 7/2015 | Gokan | |
| 2015/0314684 A1* | 11/2015 | Kronberg | B60K 37/06 340/439 |
| 2015/0317527 A1 | 11/2015 | Graumann et al. | |
| 2015/0367859 A1* | 12/2015 | Roth | B60K 37/00 701/36 |
| 2016/0001330 A1 | 1/2016 | Romack et al. | |
| 2016/0048725 A1* | 2/2016 | Holz | G01P 13/00 345/156 |
| 2016/0086391 A1* | 3/2016 | Ricci | G07C 5/008 701/29.3 |
| 2016/0121817 A1* | 5/2016 | Liu | G08C 17/02 701/2 |
| 2016/0272164 A1 | 9/2016 | Hsiao et al. | |
| 2016/0272165 A1 | 9/2016 | Hsiao et al. | |
| 2016/0272242 A1 | 9/2016 | Sham | |
| 2016/0274668 A1 | 9/2016 | Hsiao et al. | |
| 2017/0080904 A1 | 3/2017 | Hsiao et al. | |

FOREIGN PATENT DOCUMENTS

| | | |
|---|---|---|
| CN | 205632419 U | 10/2016 |
| EP | 1937525 A2 | 7/2008 |
| EP | 2949520 A1 | 12/2015 |
| JP | 2007253640 A | 10/2007 |
| KR | 2011/C89604 A | 3/2011 |

OTHER PUBLICATIONS

Specification U.S. Appl. No. 62/150,848.*
U.S. Appl. No. 14/967,366, filed Dec. 14, 2015, Final Office Action dated Aug. 31, 2016, all pages.
U.S. Appl. No. 14/967,366, filed Dec. 14, 2015, Non-Final Office Action dated Apr. 7, 2016, all pages.
U.S. Appl. No. 14/883,621, filed Oct. 15, 2015, Non-Final Office Action dated Apr. 25, 2016, all pages.
U.S. Appl. No. 14/883,621, filed Oct. 15, 2015, Notice of Allowance dated Sep. 14, 2016, all pages.
U.S. Appl. No. 14/883,605, filed Oct. 14, 2015, Non-Final Office Action dated Apr. 14, 2016, all pages.
U.S. Appl. No. 14/883,605, filed Oct. 14, 2015, Notice of Allowance dated Aug. 31, 2016.
U.S. Appl. No. 15/008,416, filed Jan. 27, 2016, Non-Final Office Action dated Jul. 6, 2016, all pages.
U.S. Appl. No. 15/008,416, filed Jan. 27, 2016, Notice of Allowance dated Oct. 24, 2016, all pages.
First Office Action with a search report dated Aug. 18, 2017 from the China Patent Office for 2016101434844, 8 pages.

* cited by examiner

VEHICLE OPERATING SYSTEM USING MOTION CAPTURE

CROSS-REFERENCE TO RELATED APPLICATIONS

The present application is a continuation of U.S. Non-Provisional application Ser. No. 14/883,621, filed Oct. 15, 2015, which claims priority to U.S. Provisional Patent Application No. 62/133,991, filed on Mar. 16, 2015, and U.S. Provisional Patent Application No. 62/150,848, filed on Apr. 22, 2015, the disclosures of which are hereby incorporated by reference in their entireties for all purposes.

BACKGROUND

Exemplary embodiments of the present disclosure relate to vehicle operating systems using image and/or gesture capture techniques, related methods and vehicles using such systems.

When operating a traditional vehicle, turning on or off an air-conditioning system, turning on or off a multimedia system, or the like, is typically achieved by directly touching buttons or screen selections. However, if a driver uses such operating methods while driving the vehicle, the operations can prove inconvenient, contribute to driver distraction, and have an overall adverse effect on safe operation of the vehicle.

SUMMARY

Exemplary embodiments of the present disclosure may address at least some of the above-noted problems. For example, according to first aspects of the disclosure, vehicle operating systems, related vehicle operating methods and vehicles using such vehicle operating systems, may provide a relatively safe, reliable and convenient operating atmosphere, with reduced driver distraction and less focused attention requirements.

In embodiments, a vehicle operating system (for operating a vehicle including a driving seat for a vehicle driver and at least one passenger seat for passengers) is provided. The vehicle operating system may include one or more camera devices for capturing and/or "shooting" images of gestures, such as head, arm, hand and/or finger actions and the like, of the driver and/or images of gestures of a passenger. Embodiments may include a storage device for storing operating signals corresponding to gestures and/or indicia of a plurality of gestures, such as shape, motion, etc.

A processing device may be included that is configured, for example, to select one of the driver and the passengers as a gesture command operator, and to control the camera device so as to capture hand or other action images of the selected gesture command operator. This may include, for example, changing a direction or other parameter of the camera to better capture gestures of the selected gesture command operator. In embodiments, the processing device may be configured to convert captured images of gestures, such as hand actions, etc., into corresponding operating signals based at least in part on the operating signals stored in the storage device, and to send out the operating signals to associated execution devices, such as navigation, entertainment, climate control, or other vehicle systems.

According to further aspects of the disclosure, an electric vehicle including a vehicle operating system as described herein may also be provided.

According to further aspects of the disclosure, a vehicle operating method may include one or more of storing operating signals corresponding to gestures; selecting one of a driver and a passenger as a gesture command operator; shooting a gesture action image of the gesture command operator; converting the gesture action image into a corresponding operating signal according to the stored operating signals; and executing, by an execution device, the corresponding operation according to the operating signal.

According to further aspects of the disclosure, a gesture command operator can be automatically (or manually) selected from the driver or the passengers, and the gesture command operator can be automatically (or manually) switched from the driver to the passenger, e.g. when the driver needs to focus their attention, so that the vehicle can be operated according to the hand actions of the passenger. This may involve, for example, reorienting a camera, switching between different cameras, etc. Therefore, interference with the driver may be avoided, and driving safety improved. Meanwhile, vehicle components may be operated by gesture actions, avoiding direct button touch or screen selection, so that the operation is made more convenient, less intensely focused, and overall safety improved.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

The embodiments of a vehicle operating system of the present disclosure will be described below with reference to the accompanying drawings.

Figure 1:
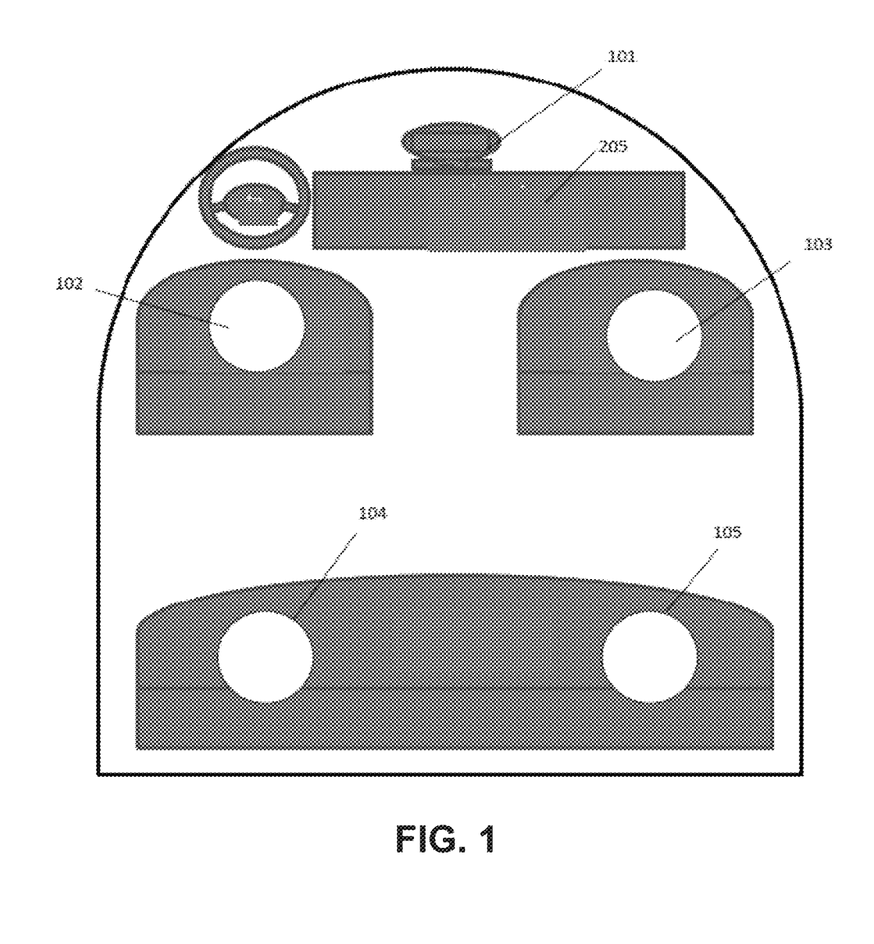
FIG. 1 shows a structural schematic diagram of an exemplary vehicle cabin according to aspects of the present subject matter.
Figure 2:
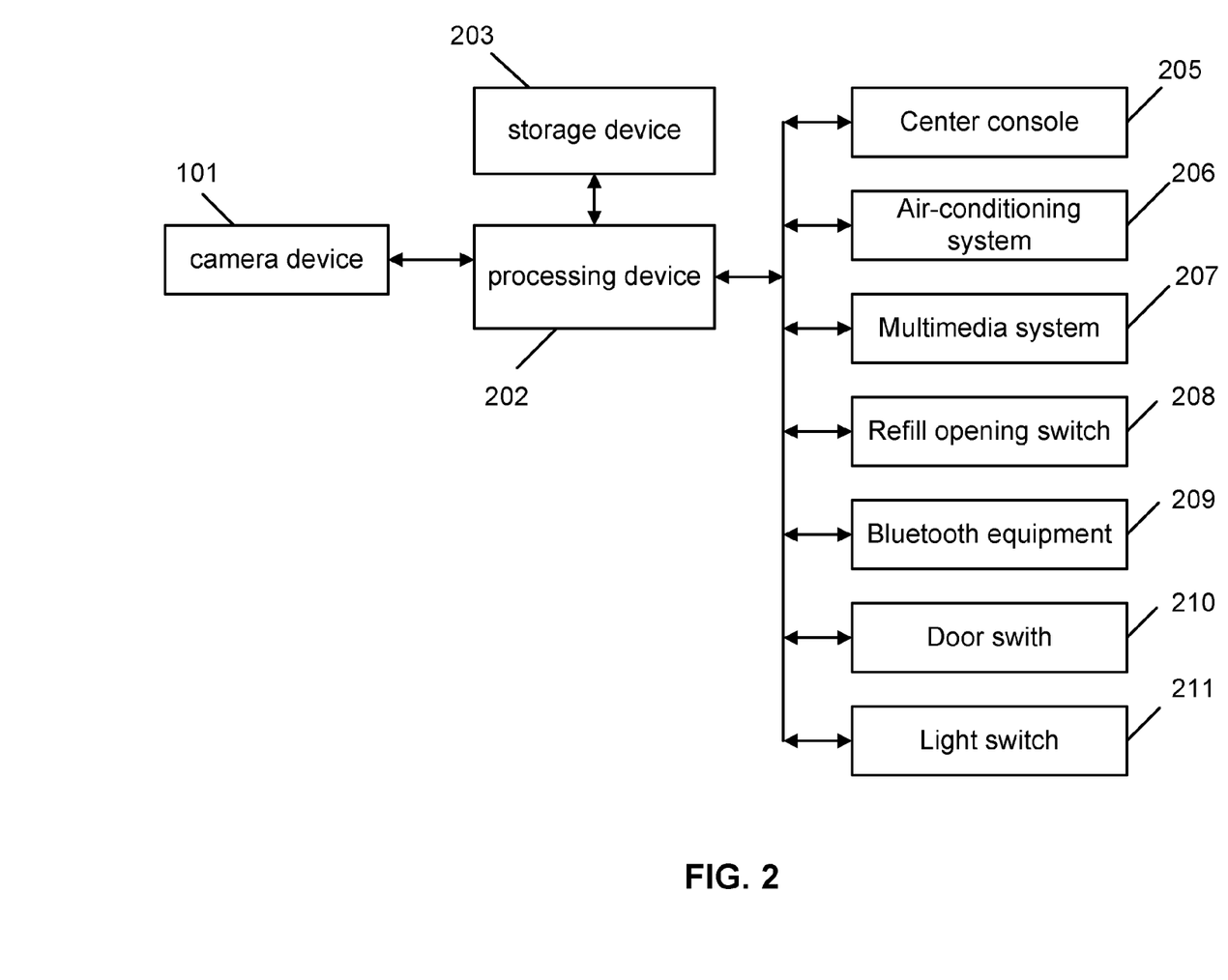
FIG. 2 shows a module diagram of an exemplary vehicle operating according to further aspects of the present subject matter.

FIG. 1 shows a structural schematic diagram of a vehicle cabin according to a first embodiment, and FIG. 2 shows a module diagram of a vehicle operating system according to further aspects of the disclosure. As shown in FIG. 1, a driving seat 102 for a vehicle driver as well as a front passenger seat 103 and rear passenger seats 104 and 105 for passengers are arranged in the cabin of the vehicle. Before the vehicle is driven, operating signals corresponding to hand actions may be stored in a storage device 203. The vehicle operating system as shown in FIG. 2 includes the storage device 203, a processing device 202, a camera device 101 and various execution devices including a center console 205, an air-conditioning system 206, a multimedia system 207, a refill opening switch 208, a Bluetooth equipment 209, a door switch 210, an interior light switch 211, and any number of other like systems and/or subsystems.

When the vehicle is running, the processing device 202 may select one of the driver or the passengers as a gesture command operator, who has the right to operate the above execution devices through gestures such as hand actions, etc. That is to say, the gesture command operator can be switched between the driver and the passenger(s). In some examples, the system may allow a user to set a default for the gesture command operator, the system may respond to specific commands that set the gesture command operator, and/or the system can infer the gesture command operator based on a number of inputs. One or more camera device(s) 101 may be arranged in the cabin for shooting images of gestures from the gesture command operator and transmitting the gesture images to the processing device 202.

Operating signals corresponding to various gestures may be pre-stored in the storage device 203. The processing device 202 may convert the gesture action images captured by camera(s) 101 into corresponding operating signals according to the operating signals corresponding to the hand actions stored in the storage device 203, and send the operating signals to the corresponding execution devices. The execution devices may then execute the corresponding operations according to the operating signals.

In some examples, gesture action images from multiple camera devices 101 may be interpreted to determine the corresponding operating signals. For example, a hand moving toward one camera may result in images that are only slightly different, whereas images from a camera pointing perpendicular to the direction of motion may provide images with significant and easy to discern changes. By evaluating images from multiple cameras, the system may be able to better judge 3-dimensional gestures, more easily detect movement from desired angles, etc.

According to methods described herein, one of the driver or the passengers can be selected as the gesture command operator, and when the driver needs to focus their attention to driving, the right of operating the execution devices can be transferred to the passenger, so as to avoid distraction of the driver and improve vehicle driving safety.

Figure 3:
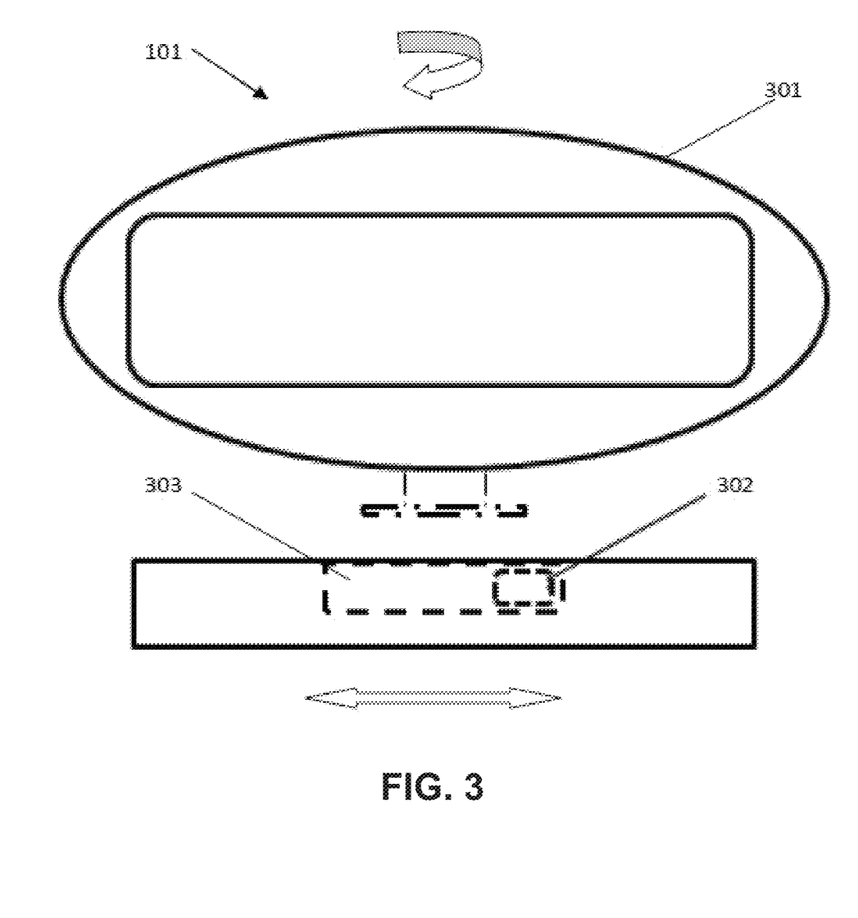
FIG. 3 shows a structural schematic diagram of an exemplary camera device according to further aspects of the present subject matter.

An exemplary structure for a camera device 101 is shown as FIG. 3. The camera device 101 includes a camera 301 and a driving device for the camera 301, the driving device comprises a motor 302 and a gear set 303, and the motor 302 controls the gear set 303 to drive the camera 301 to move leftwards and rightwards in the direction as shown by the arrow of FIG. 3 or to rotate. Because the camera 301 can move or rotate, when the driver is selected as the gesture command operator, the camera 301 can be directed at the driver for shooting, and when the gesture command operator is switched from the driver to a passenger, the camera 301 can be directed at the passenger for shooting through moving leftwards and rightwards and/or rotating.

Generally, systems may be set such that the passenger sitting on the front passenger seat 103 ("front passenger" hereinafter) acts as the passenger who can become the gesture command operator. When the front passenger acts as the passenger who can become the gesture command operator, only one shooting device 101 need be arranged in front of the driving seat 102, the front of the driving seat 102 herein is not limited to the right front of the driving seat 102, e.g. the front between the driving seat 102 and the front passenger seat 103 as shown in FIG. 1 is also in this scope, and the camera device 101 can conveniently capture the hand actions of the driver and the hand actions of the front passenger by moving or rotating. However, it should also be appreciated that multiple cameras, with different locations and/or directions may be used to switch between different gesture command operators. Additionally, different pointing mechanisms for individual cameras are also possible, such as digital cropping, rotating lenses, spherical (or semi-spherical) cameras, etc.

In some embodiments, the system may also set the passenger sitting in the rear passenger seat 104 or the rear passenger seat 105 as the gesture command operator. In such cases, another camera device may also be arranged (besides the camera device 101). Such additional camera(s) may be arranged, for example, at the upper part of the front part of the vehicle cabin (the front part of the cabin herein refers to the part ahead of the front passenger seat 103 and the driving seat 102 of the cabin, and the upper part refers to the part higher than the seats in the cabin), is a door frame between the front and back seats, in a roof of the vehicle, etc. When the gesture command operator is the driver, the camera device 101 in front of the driving seat 102 may be used, and when the gesture command operator is switched to the passenger in the rear passenger seat 104 or the rear passenger seat 105, the active camera device may be switched to another camera better positioned to capture gestures of the rear passenger(s) (e.g. if the camera device 101 in front of the driving seat 102 cannot clearly and completely capture hand actions or other gestures of the passenger in the rear passenger seat 104 or the rear passenger seat 105).

Figure 4:
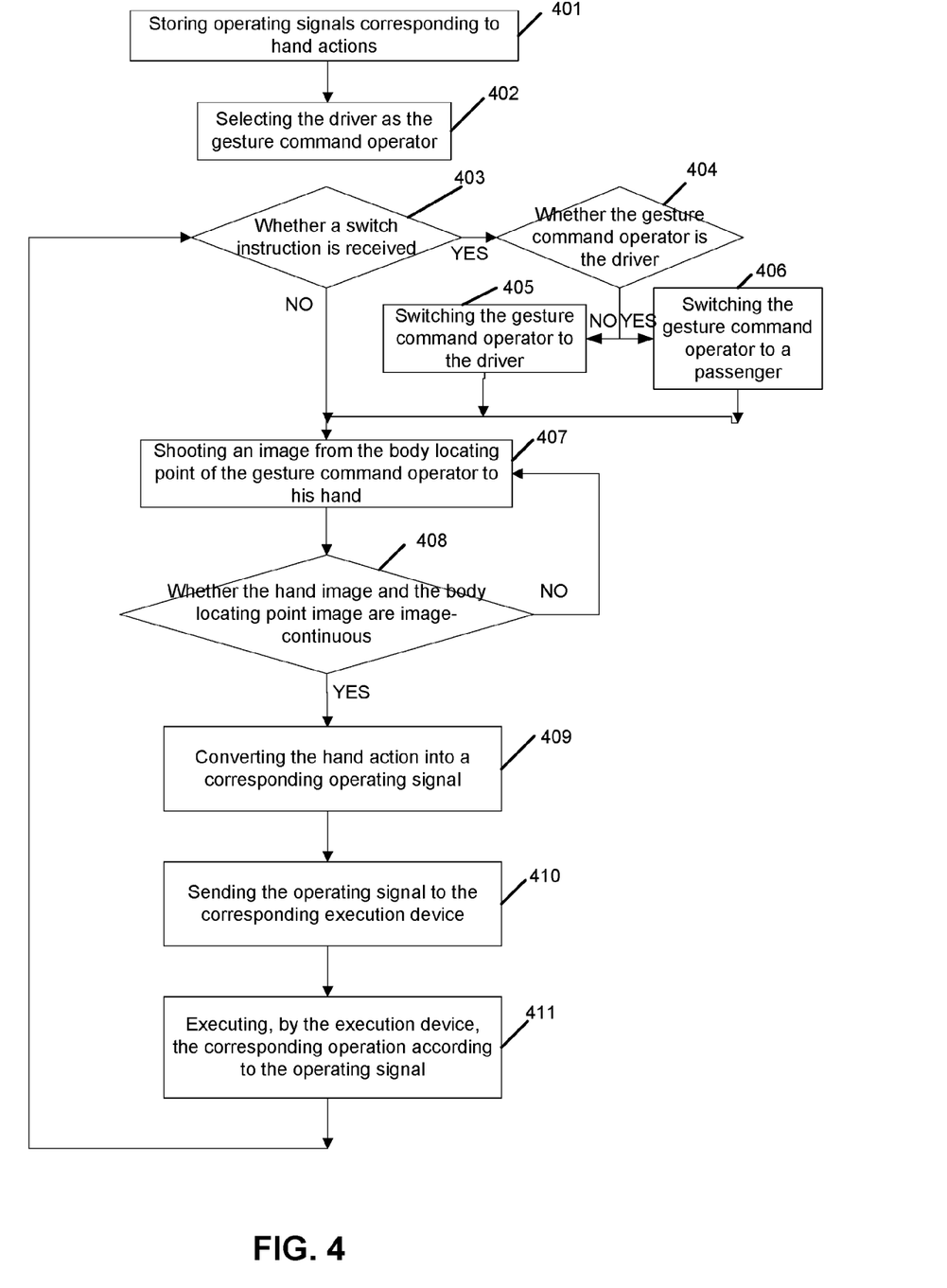
FIG. 4 shows a flow diagram of an exemplary vehicle operating method according to further aspects of the present subject matter.

FIG. 4 shows a flow diagram of a vehicle operating method according to aspects of the present invention. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

As shown in 401, before a vehicle is driven, operating signals corresponding to various gestures, such as hand actions, may be stored, e.g. in the storage device 203. This may also include storing any number of indicia used to determine whether a particular gesture is being performed based on captured gesture action images. For example, various shapes, motions, or other parameters may be stored, and used by the command system to perform various gesture recognition techniques based on captured images. This step may be preset in the vehicle by a manufacturer before the vehicle leaves the factory, or set by a user through a bootstrap program after the vehicle is sold and before first (or subsequent) driving. In some examples, the user may be allowed to associate specific gestures with certain operating signals, e.g. by entering a "record mode" and/or by selecting from a menu of preconfigured gestures that the system can recognize.

The processing device 202 selects one of the driver and the passengers as the gesture command operator. In this embodiment, as in 402, each time the vehicle is started, the processing device 202 selects the driver as the gesture command operator by default, and controls the camera device 101 to be directed at the driver, so as to capture the hand actions or other pre-defined gestures of the driver. Then, the processing device 202 determines whether to switch the gesture command operator, e.g. according to whether a switch or other specified command is received.

Proceeding with 403 to 406, a subroutine for switching the gesture command operator is shown. The subroutine depicted in 403 to 406 can not only describe how the gesture command operator may be switched to the passenger when the current gesture command operator is the driver, but also can be used to show the gesture command operator is switched to the driver when the current gesture command operator is the passenger.

In 403, a processing device (such as 202) may determine whether a switch instruction is received, and if so, 404 to 406 are carried out to switch the gesture command operator. Otherwise, the flow may proceed with 407 to continue capturing the gesture actions of the current gesture command operator. In some examples, the switch instruction can be made by pressing a button. In other embodiments, the switch instruction may (additionally or alternatively) be a hand action of the current gesture command operator. For example, when the hand action of the current gesture command operator is that the five fingers are spread, the palm is roughly perpendicular to the forearm, then a fist is made, the five fingers are spread again and the palm lightly rocks leftwards and rightwards, it is regarded that the gesture command operator sends out a switch instruction. Of course, any number of other gestures are possible, including gestures using various finger, hand, arm, head, and torso motions, etc. In some examples, multiple frames from the camera(s) may be stored, for example, to recognize previous gesture motions after a particular part of an action is recognized.

When the switch instruction is received, the flow may proceed with 404, to judge whether the gesture command operator is the driver, and if so, the flow may continue with 406 to switch the gesture command operator to a passenger. Otherwise, the gesture command operator is a passenger, and the flow may proceed with 405 to switch the gesture command operator to the driver. In some examples, each time the vehicle is started, the processing device 202 may select the driver as the gesture command operator by default, and during the first switching the processing device 202 can switch the gesture command operator from the driver to a passenger, and during the second switching, the processing device 202 can switch the gesture command operator from the passenger to the driver.

If no switch instruction is received in 403, or after switching operations 405/406 are complete, the flow may continue with 407 to 409, in which the gesture(s) (such as hand actions) shot by the camera device 101 is converted into the corresponding operating signals, e.g. by the processing device 202.

In some examples, a checking function such as shown in 407 and 408 may be adopted, e.g. to prevent interference from people other than the gesture command operator or from other factors with the operation. In this case, a captured hand action may be checked, to determine whether the hand action comes from the gesture command operator, so as to exclude the interference from people other than the gesture command operator or other factors. Of course, other gestures may also be checked using similar techniques.

As shown in 407, the camera device 101 not only shoots the relevant hand actions, but also shoots an image from a body locating point of the gesture command operator to his hand. The body locating point as discussed herein may be, for example, a head or breast, e.g. the image of the body part from the head or the breast of the gesture command operator to his hand may be completely captured. Next, in 408, the processing device 202 judges whether the hand image and the body locating point image are image-continuous in the shot image, namely whether the hand in the image continuously extends to the body locating point to form the body part of the operator. If so, it is indicated that the shot hand image comes from the gesture command operator, otherwise, it is indicated that the shot hand image may come from the interference of people other than the gesture command operator or other factors, and then step 407 is carried out again to re-capture an image. To improve the accuracy of judgment, the body locating point may be at least above the upper arm of the hand making the action.

After the hand action (or other gesture) is checked, the flow may continue with 409, in which the hand action may be converted into the corresponding operating signal. Since the operating signals corresponding to various gestures have been stored in the storage device 203 in 401, the processing device 202 converts the gesture action image into the corresponding operating signal, e.g. based on comparisons between gesture image information associated with the stored operating signals and the captured gesture action image(s). This may include various types of pattern, anatomical, and/or motion recognition techniques.

In an exemplary embodiment, each operating signal may correspond to a two-step hand action, the first step of the hand action being to select an execution device and the second step of the hand action being to instruct the selected execution device to carry out a specific operation. The first step of the hand action for selecting an execution device may be an Arabic numeral indicated by a gesture, e.g. the Arabic numeral 1 indicated by a gesture expresses selecting the center console 205, the Arabic numeral 2 indicated by a gesture expresses selecting the air-conditioning system 206 and the like. The second step of the hand action for instructing the selected execution device to carry out an specific operation may include an action for instructing the execution device to be turned on or turned off (e.g. the index finger touches the thumb in a ring shape and the other three fingers are upright to express turn-on), an action for instructing raising or lowering parameters (temperature, volume, etc.) of the execution device (e.g. the index finger rotates clockwise or anticlockwise), an action for instructing switching between options of the execution device (e.g. the five fingers are upward and move up to represent moving to the previous option, the five fingers are downward and move down to represent moving to a next option) and the like. Taking the operation of raising the temperature of the air-conditioner as an example, the hand action corresponding to the operating signal may include: selecting the air-conditioning system 206 through the Arabic numeral 2 indicated by a gesture, and then raising the temperature through the gesture expressing raising the temperature. Any number of other gestures and combinations of gestures are possible for identifying the execution device and function, or other command techniques, such as function-driven commands that cause execution of multiple devices.

In some examples, the system may transition between different modes, in which similar gestures may be associated with different execution commands. For example, a first mode may be an audio control mode, in which up and down hand gestures are associated with volume control, whereas a second mode may be an environmental control mode in which the same up and down hand gestures are associated with temperature control. Different mode indicators associated with the current gesture command mode may be displayed on a central console or the like to inform the user of the current gesture command mode, projected on a windshield or other transparent surface, and/or audible cues may be provided that inform the user of the current mode, without them having to focus on a display.

After the hand action is converted into the corresponding operating signal, the flow may proceed with 410, in which a processing device (e.g. 202) may determine the execution device corresponding to the operating signal, and send the operating signal to the corresponding execution device. This may be done in various ways, including sending commands to integrated devices via wiring in the vehicle, sending wireless commands to Bluetooth or other peripheral devices, etc. In some examples, commands may also be sent to execution devices outside of the vehicle, such as automatic garage doors, home door locks, home lighting, etc.

The flow may proceed with 411, in which the corresponding execution device(s) receive the operating signal, and execute the corresponding operation according to the operating signal. As mentioned above, the execution device includes at least one of a center console 205, a multimedia system 207, a door switch 210, a refill opening switch 208, Bluetooth equipment 209, an interior light switch 211, an air-conditioning system 206, as well as any other onboard, peripheral or remote device that the control system is configured to communicate with.

Figure 5A:
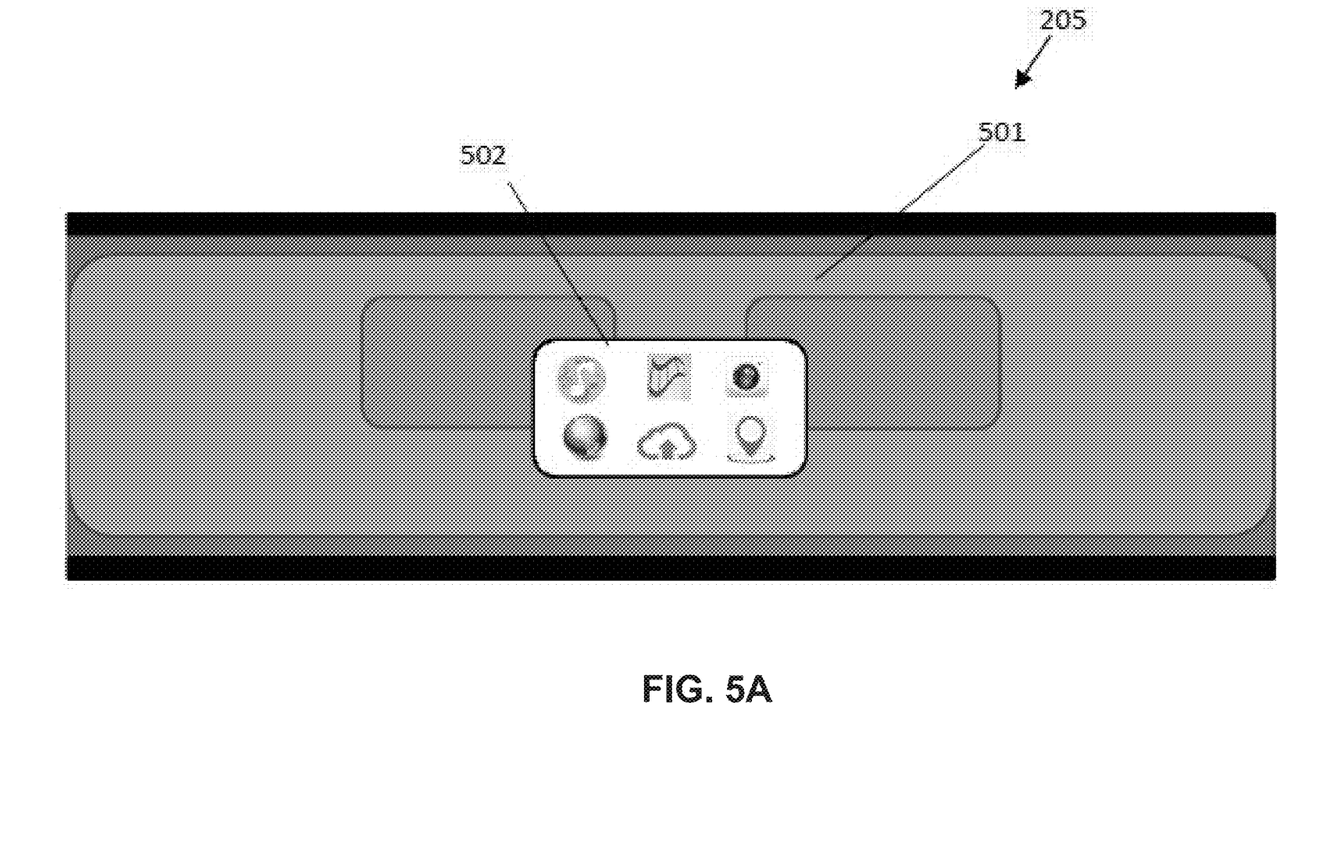
FIG. 5A and FIG. 5B show schematic diagrams of exemplary state changes when a center console according to aspects of the present subject matter executes operating signals.
Figure 5B:
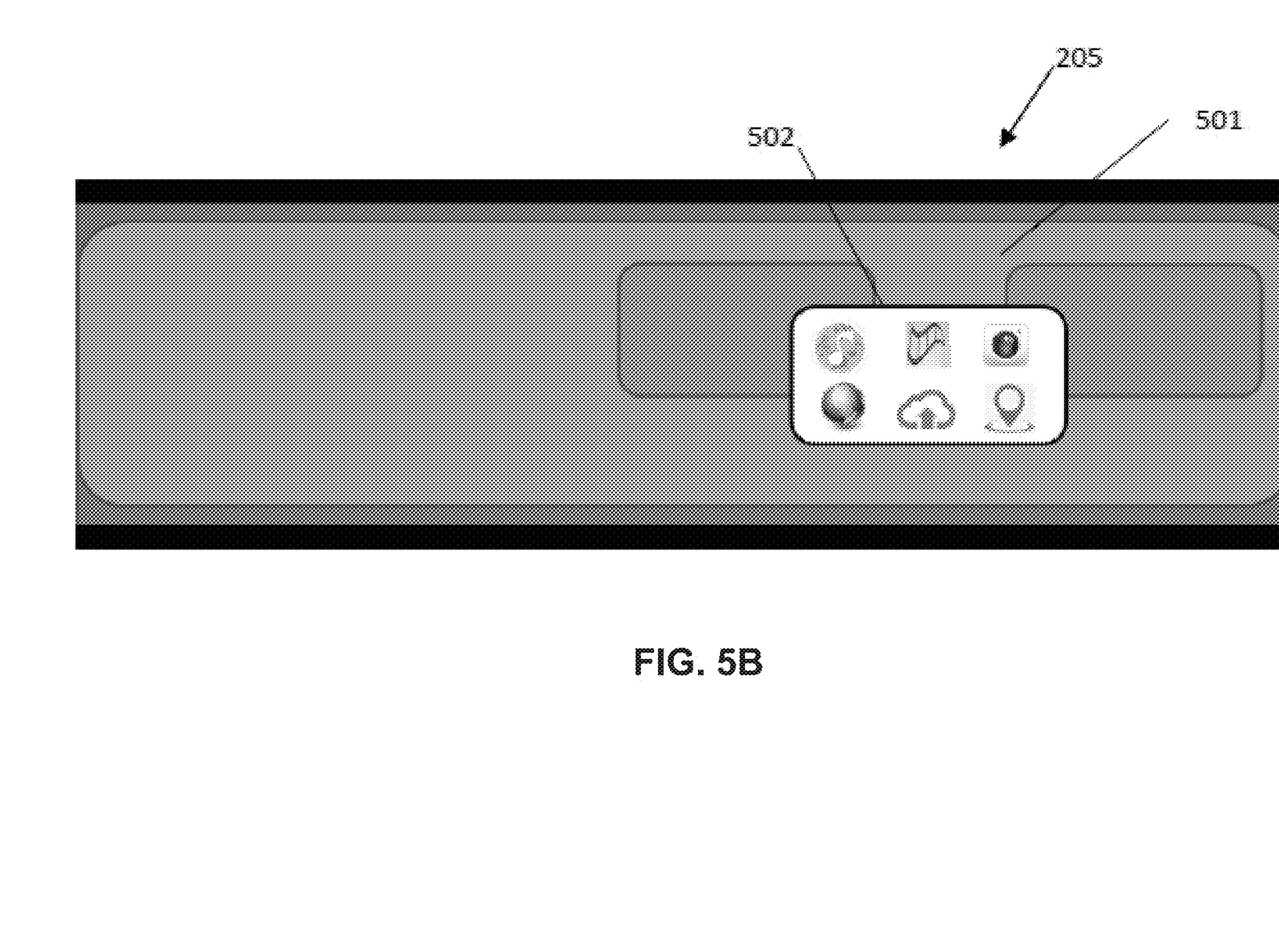

Taking the action for moving a touch screen operating interface 502 in the center console 205 as an example, a process of converting a hand gesture action into the corresponding operating signal, sending the operating signal to the execution device and executing the corresponding operation by the execution device, is described below.

As shown in FIG. 1, FIG. 5A and FIG. 5B, the center console 205 is arranged at the front part of the cabin and provided with a touch screen 501. In this example, the touch screen 501 extends along the center console 205 at least partially between the driving seat 102 and the front passenger seat 103. The complete touch screen 501 is adopted in this embodiment, and a plurality of touch screens may also be used in other embodiments. The touch screen 501 is powered on to display a touch screen operating interface 502, and a plurality of touch buttons are provided on the touch screen operating interface 502. Components of the vehicle can be controlled conventionally by touching the touch buttons on the touch screen operating interface 502, or according to aspects of the present disclosure by the gestures of the gesture command operator.

The touch screen operating interface 502 of the center console 205 in this embodiment can move on the touch screen 501, and the touch screen 501 at least extends from the front part between the driving seat 102 and the front passenger 103 to the front part of the front passenger seat 103, so when the driver needs to use the center console 205, the touch screen operating interface 502 can move to a part of the touch screen 501 closer to the driver, as shown in FIG. 5A; and when the passenger of the front passenger seat 103 needs to use the center console 205 (e.g. the passenger is the gesture command operator), the touch screen operating interface 502 can move to a part of the touch screen 501 that is closer to the passenger of the front passenger seat 103, as shown in FIG. 5B.

In some examples, the movement of the touch screen operating interface 502 on the touch screen 501 may be based on a gesture action of the gesture command operator, as described herein, and/or it may be automatically initiated based on switching the gesture command operator.

In one example, the gesture command operator makes the Arabic numeral 1 indicated by a gesture and then makes the action that the five fingers are spread and the palm slides rightwards, the processing device 202 converts the gesture and the action into an operating signal, and the operation corresponding to the operating signal is that the touch screen operating interface 502 on the center console 205 moves rightwards on the touch screen 501. The processing device 202 sends the operating signal to the center console 205, and finally, the center console 205 receives the operating signal and enables the touch screen operating interface 502 to move rightwards on the touch screen 501.

In some examples, vehicle command systems such as described herein may also be configured to permit certain operating signals, that are normally disabled during operation of the vehicle, if initiated via a gesture command. For example, certain Bluetooth phone commands may be disabled when a vehicle is in motion, but a gesture command may be allowed to initiate the command, thereby allowing the driver or passenger to utilize the function in a less distracting way than conventional methods. Likewise, certain functions may be disabled when the driver is the gesture command operator, and certain functions may be enabled when a passenger is the gesture command operator (or vice versa). One example of this might be allowing the driver to easily adjust the climate control temperature on their side of the vehicle using gesture commands when they are the gesture command operator, and reconfiguring the command system to allow the passenger to control the climate control temperature on their side of the vehicle using gesture commands when they are the gesture command operator. It should further be appreciated that, in some instances, multiple cameras, or cameras with wide viewing angles may allow for multiple users to act as gesture command operators simultaneously. For example, in the case of non-contradictory commands (such as separate climate control regions), different cameras may be configured to received simultaneous commands from the driver and the passenger, and the command system may implement both sets of commands. In cases with contradictory commands, the system may also be configured to assign a hierarchy, e.g. whereby the driver's gesture commands are given precedence.

The present disclosure further provides a vehicle (such as an electric automobile) using a vehicle operating system as described herein, with other parts of the vehicle using the framework of the existing vehicle. The vehicle operating system may be substantially the same as described herein, and is therefore not redundantly described.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. A vehicle operating system for operating a vehicle including a driving seat for a vehicle driver and at least one passenger seat for passengers, the vehicle operating system comprising:
   camera devices for capturing at least one of images of gestures of the driver and images of gestures of a passenger;
   a storage device for storing operating signals corresponding to gesture actions;
   a processing device configured to:
   control the camera devices to capture gesture action images of the driver and passenger simultaneously or substantially simultaneously, wherein a first action image of the driver and a second action image of the passenger are captured simultaneously or substantially simultaneously,
   convert the captured gesture action images into corresponding operating signals according to the operating signals corresponding to the gesture actions stored in the storage device such that the first action image is converted into a first operation signal and the second action image is converted into a second operation signal;
   determine the first operational signal is from a gesture by the driver and determine the second operational signal is from a gesture by the passenger, the first and second operational signals both for operating a same component of the vehicle,
   determine whether the first operation signal is consistent with the second operation signal, and
   send out the first operational signal and second operation signal as operating signals in a preset order such that the second operation signal is sent before the first operational signal in response to the determination that first operation signal is consistent with the second operation signal; and
   execution devices configured to receive the operating signals sent by the processing device, and to execute operations corresponding to the operating signals.

2. The vehicle operating system of claim 1, wherein the same component being operated by first and second operational signals is not an in-vehicle camera.

3. The vehicle operating system of claim 2, wherein the same component being operated by first and second operational signals is not an in-vehicle camera includes an in vehicle air-conditioning system.

4. The vehicle operating system of claim 3, wherein the first operational signal is for navigating one or more options for the component.

5. The vehicle operating system of claim 1, wherein the first operational signal is for selecting an operational mode for the component.

6. The vehicle operating system of claim 1, wherein the camera devices are configured to capture an image from a body locating point of a corresponding gesture command operator to a hand of the gesture command operator, and wherein the processing device is configured to check whether the gesture image and the body locating point image are image-continuous, and if so, the gesture actions are converted into the operating signals.

7. The vehicle operating system of claim 6, wherein the body locating point comprises an arm, head or breast of the gesture command operator.

8. The vehicle operating system of claim 1, wherein each of the camera devices comprises a camera and a driving device for the camera, and the driving device configured for driving the camera to move or rotate.

9. The vehicle operating system of claim 8, wherein the driving device comprises a motor and a gear set.

10. The vehicle operating system of claim 1, wherein one of the camera devices is arranged in front of the driving seat.

11. The vehicle operating system of claim 1, wherein one of the camera devices is arranged at a different location providing a view of the back seat.

12. The vehicle operating system of claim 1, wherein the execution devices comprise at least one of a multimedia system, a door switch, a refill opening switch, Bluetooth equipment, a light switch and an air-conditioning system.

13. The vehicle operating system of claim 1, wherein,
the execution devices comprise a center console provided with at least one touch screen, the touch screen at least extends from the front part between the driving seat and the front passenger seat to the front part of the front passenger seat,
a touch screen operating interface is displayed on the touch screen, and
the center console can control the touch screen operating interface to move on the touch screen according to an operating signal.

14. The vehicle operating system of claim 1, wherein,
each operating signal corresponds to a two-step hand action,
a first step of the hand action is used for selecting an execution device, and
a second step of the hand action is used for instructing the selected execution device to carry out a specific operation.

15. An electric vehicle, comprising:
a driving seat for a vehicle driver;
at least one passenger seat for passengers; and
a vehicle operating system including:
    camera devices for capturing gesture action images of the driver and passenger simultaneously or substantially simultaneously;
    a storage device for storing operating signals corresponding to gesture actions;
    a processing device configured to:
    control the camera devices to capture gesture action images of the driver and passenger simultaneously or substantially simultaneously,
    convert the captured gesture action images into corresponding operating signals based at least in part on a comparison between the gesture action images and parameters associated with the gesture actions,
    determine a first operational signal is from a gesture by the driver and determine a second operational signal is from a gesture by the passenger, the first and second operational signals both for operating a same component of the vehicle,
    determine whether the first operation signal is consistent with the second operation signal, and
    send out the first operational signal and second operation signal as operating signals in a preset order such that the second operation signal is sent before the first operational signal in response to the determination that first operation signal is consistent with the second operation signal; and
    an execution device configured to receive the operating signals sent by the processing device, and to execute operations corresponding to the operating signals.

16. A method for operating a vehicle including a driving seat for a vehicle driver and at least one passenger seat for passengers, the method comprising:
    storing operating signals corresponding to gesture actions;
    controlling the camera devices to capture gesture action images of the driver and passenger simultaneously or substantially simultaneously, wherein a first action image of the driver and a second action image of the passenger are captured simultaneously or substantially simultaneously;
    converting the captured gesture action images into corresponding operating signals according to the operating signals corresponding to the gesture actions stored in the storage device, such that the first action image is converted into a first operation signal and the second action image is converted into a second operation signal;
    determining the first operational signal is from a gesture action image for the driver and determine the second operational signal is from a gesture action image for the passenger, the first and second operational signals both for operating a same component of the vehicle;
    determining whether the first operation signal is consistent with the second operation signal; and
    send out the first operational signal and second operation signal as operating signals in a preset order such that the second operation signal is sent before the first operational signal in response to the determination that first operation signal is consistent with the second operation signal.

17. The method of claim 16, wherein the same component being operated by first and second operational signals is not an in-vehicle camera.

18. The method of claim 16, wherein the same component being operated by first and second operational signals is not an in-vehicle camera includes an in vehicle air-conditioning system.

19. The method of claim 16, wherein the first operational signal is for navigating one or more options for the component.

20. The method of claim 16, wherein the first operational signal is for selecting an operational mode for the component.

* * * * *